Patented Mar. 2, 1948

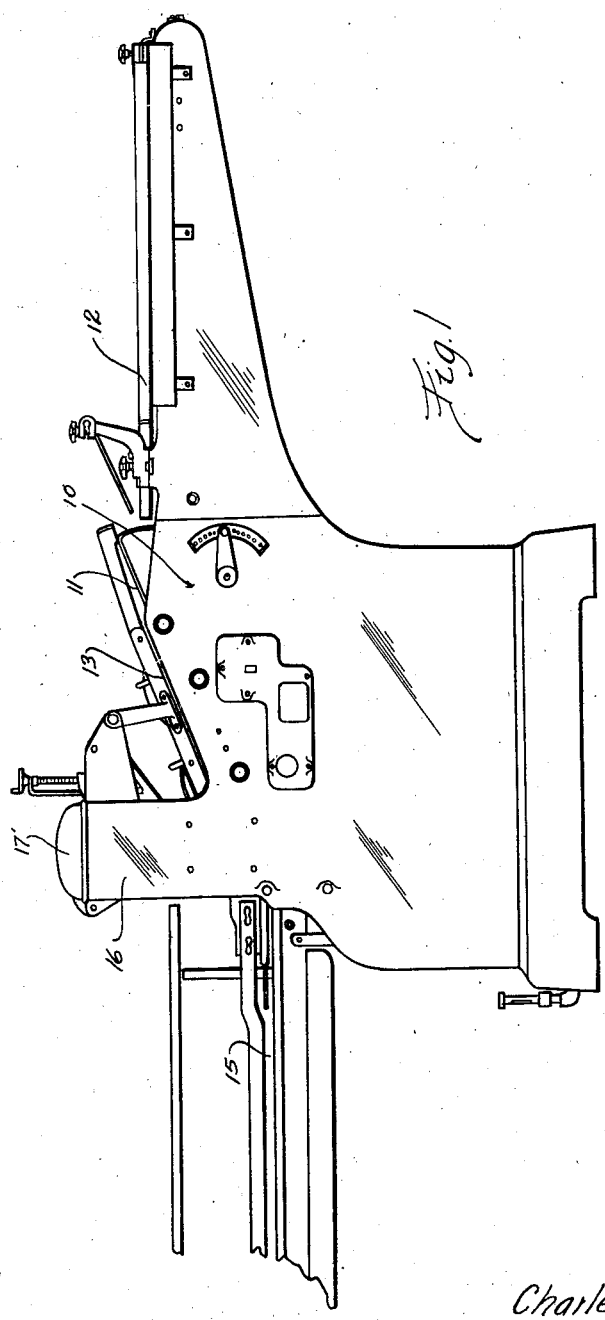

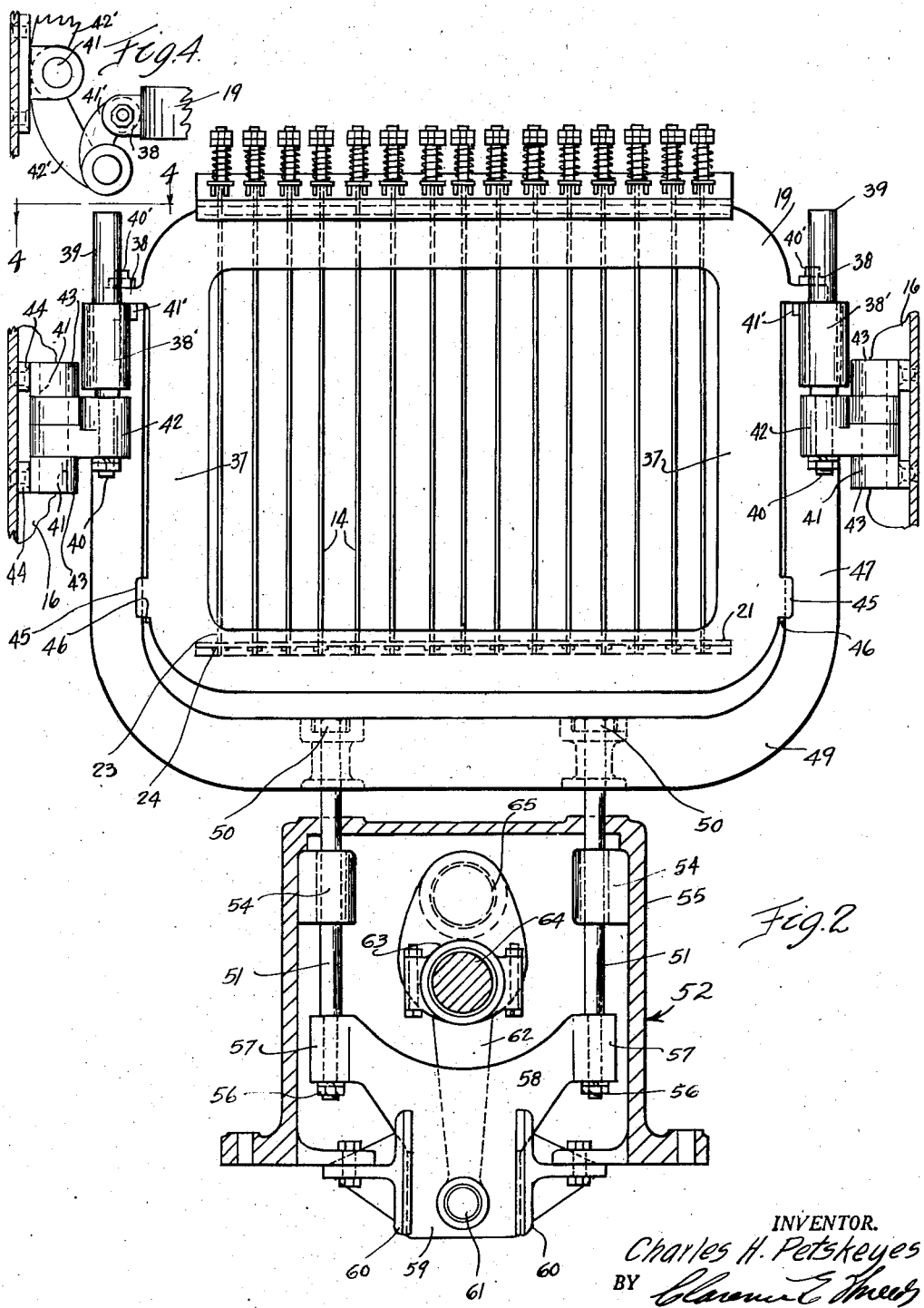

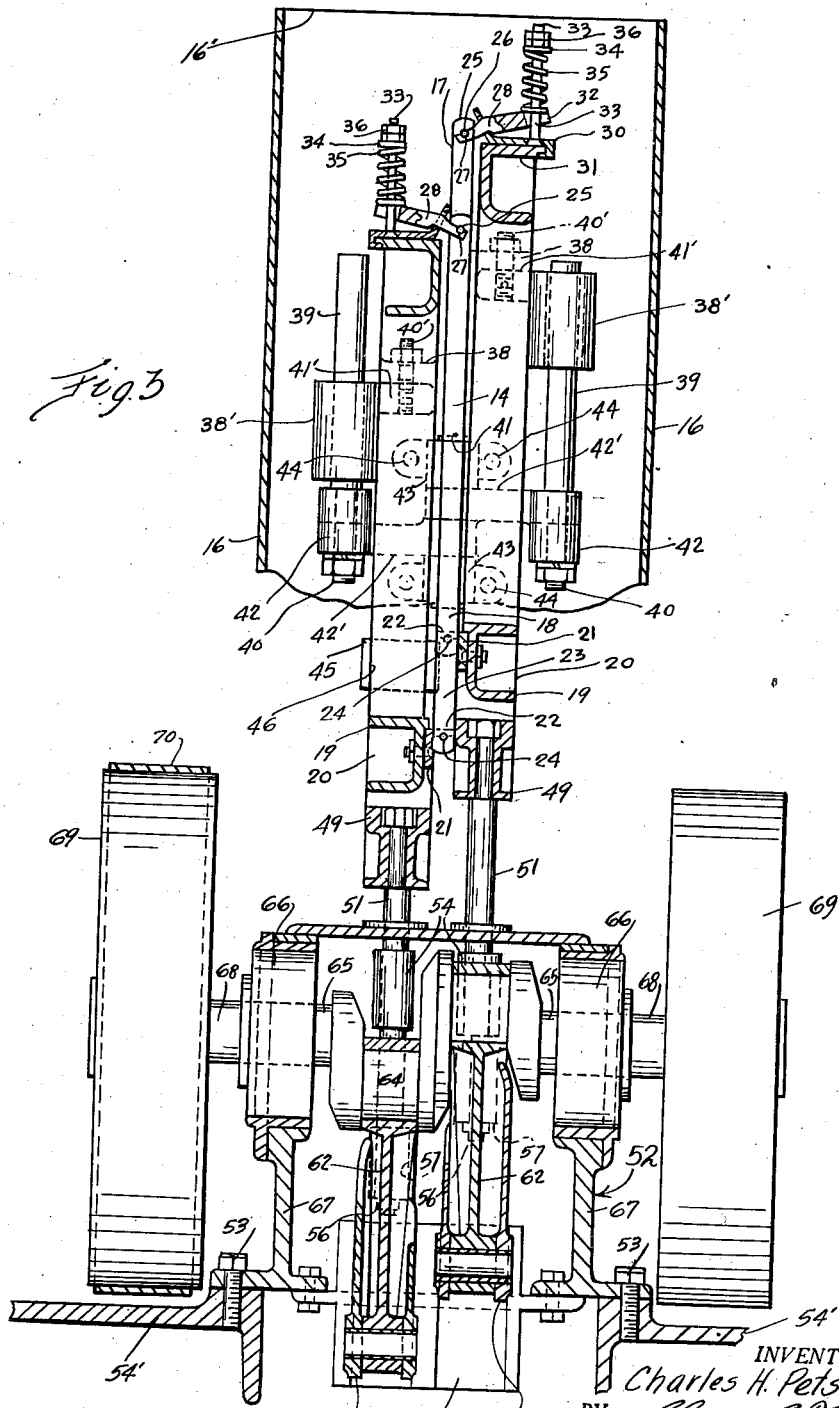

2,437,122

UNITED STATES PATENT OFFICE 2,437,122

KNIFE FRAME ATTACHING MEANS FOR MULTIPLE RECIPROCATING BLADE BREAD SLICING MACHINES

Charles H. Petskeyes, Davenport, Iowa, assignor to Gellman Manufacturing Company, Rock Island, Ill., a corporation of Illinois Application June 9, 1945, Serial No. 598,457

1 Claim. (Cl. 146—153)

This invention relates to certain new and useful improvements in knife frame attaching means for multiple reciprocating blade bread slicing machines and has for its principal object the provision of an improved construction of this character which will be highly efficient in use and economical in manufacture.

In bread slicing machines of the type disclosed in U. S. Patent No. 2,024,414, it has been by experience determined that the most efficient and economical slicing of fresh bread so as to avoid waste and excessive crumbs or tearing or otherwise rupturing the loaf of bread, is obtained by a bread slicing machine in which the slicing knives reciprocate uniformly at high speed and without what is known in the art as "walking" or "buckling."

It is therefore an object of this invention to provide a bread slicing machine in which the knives are reciprocated at maximum speed, with the minimum degree of noise and without a tendency to "creep" or "walk."

It is another object of the invention to provide a mounting for the slicing knives which will be flexible to permit of any variation caused by the movement of the slicing knife mountings.

Another object of the invention is the provision of a driving means for slicing knife means which requires the shortest possible stroke, thus resulting in the maximum efficiency of slicing operation upon the bread. A still further object of the invention is to provide in a bread slicing machine a frame carrying the slicing knives and a saddle carrying the frame, whereby the frame may be removed from the saddle without removal of any substantial part of the slicing machine, thus facilitating removal of the knives for replacement or repair.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a bread slicing machine with which my invention is associated;

Fig. 2 is a part sectional and elevational view illustrating the relationship between one of the knife carrying frames and saddles therefor, embodied in the invention;

Fig. 3 is a fragmentary sectional detail view illustrating the knife carrying frames and saddles therefor together with the driving mechanism for the frames; and Fig. 4 is a fragmentary view taken substantially on line 4—4 of Fig. 2.

The drawings illustrate the preferred form of construction by which the several objects of my invention are accomplished and is the preferred form of construction by which I have found that the best results can be accomplished.

Referring to the drawings, my improved bread slicing machine is indicated at 10. This machine includes an inclined runway 11 to which bread is transferred from a conveyor machine 12 for gravitation down an inclined chute 13 to the slicing knives 14 and thence to a guideway 15 to a bread wrapping machine (not shown) the latter constructed substantially in accordance with United States Patents Nos. 2,276,590; 2,252,028; 2,235,503; 2,232,558 and 2,230,797.

The bread slicing machine 10 further includes a housing 16 which houses the knives 14. These knives 14 are arranged in substantially spaced relation with respect to each other and reciprocated in opposite directions and are arranged in sets, indicated at 17 and 18. Each set of knives is supported by a frame 19. Each frame at its lower rail 20 carries a transversely extending bar 21 having a horizontal flange 22 provided with equally spaced slots for the reception of the lower end portions 23 of the knives so as to dispose the pin elements 24 of said knives beneath the flange 22. The upper end portions 25 of the knives carry pin elements 26 adapted to have connection as at 27 with levers 28. These levers 28 are pivotally carried by a mounting plate 30 removably connected to the upper rail 31 of the frame. Corresponding end portions of the lever portions 28 are bifurcated as at 32 and fitting into these bifurcated end portions are stud shafts 33. Disposed between washer elements 34 carried by the stud shafts 33 and the bifurcated end portions 32 of the levers 28, are spring members 35, the arrangement being such that by adjusting nuts 36 upon the studs 33, the springs 35 may be compressed and thereby effect pivotal movement of the levers 28 to render the knives 14 taut and substantially straight.

Each frame 19 has formed on opposite side rails 37 thereof, laterally extending lugs 38. These lugs are pivotally connected by means of a nut bearing screw stud 40' to links 41' formed on bearing sleeves 38' through which reciprocate the posts 39, the lower ends of which are connected as at 40 to bearing sleeves 42. The bearing sleeves 42 have laterally extending links 42' pivotally connected by means of pins 41 to lugs 43 carried by the housing 16 as at 44. By this arrangement the frames may have lateral movement relative to each other and thereby in effect be substantially self-adjustable during slicing operation. These frames at their lower end portions, carry oppositely disposed lateral projections 45 providing grooves 46 for the reception of the side rails 47 of a saddle 49 the latter being formed substantially U-shaped, and between the side rails 47 of which the frame 19 is mounted.

Each saddle 49 has secured thereto, as at 50, rod elements 51. A suitable casing is indicated at 52, and this casing 52 is secured as at 53 to a wall element 54' of the housing 16. These rod elements 51 reciprocate through bearing sleeves 54 formed as an integral part of the adjacent side walls 55 of the casing 52. The lower end portions of these rod elements 51 are connected as at 56 to bearings 57 formed as an integral part of a crosshead 58. This crosshead 58 has a depending web 59 operating between a suitable guide 60. The lower end portion of this web 59 is connected by means of a pin 61 to a connecting rod 62 having a suitable bearing 63 embracing the crank portion 64 of a suitable crank shaft 65. This crank shaft 65 is journaled in suitable bearings 66 carried by adjacent side walls 67 of the casing 52. The ends 68 of this crank shaft each carry a suitable fly wheel 69, and one or both of these fly wheels are driven by a suitable drive belt 70 (Fig. 3).

The arrangement is such that upon rotation of the crank shaft 68, the rods 51 will be caused to reciprocate in their bearing sleeves 54 and thus reciprocate the saddles 49, and as these saddles 49 reciprocate they carry the frames 19 therewith, and upon reciprocation of these frames 19 the bearing sleeves 38 thereof reciprocate with respect to the posts 39. Inasmuch as the connection between these posts 39 and the wall of the housing, is of a hinged type, it is obvious that the frame members adjust themselves to accommodate for any variation of relationship therebetween due to their reciprocation. This renders the frames self-adjustable and permits them to assume a position with respect to each other which will have the greatest efficiency upon the bread during the slicing operation.

It is also important to note that by the provision of the crosshead and connecting the same directly to the crank portion 64, I have provided the shortest possible movement of the saddle through a minimum of space, thus resulting in a short but positive reciprocatory movement between the frames. With this short and positive reciprocatory movement between the frames, the knives will have a very definite slicing effect upon the bread, with the result that in order to slice the bread it is not necessary for the knives to move an excessive distance in either direction. This results in the reduction to a minimum of the amount of crumbs and has the effect of preventing the bread from being buckled or warped and from being torn or otherwise ruptured.

Should it be necessary to remove the frame 19, all that is necessary is to remove the nut of each screw stud 40' and lift the frame from its mounting, the post 39.

The open end portion 16' of the housing 16 is normally closed by a suitable cover 17'.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A bread slicing machine including a housing comprising a pair of saddles adapted to reciprocate in opposite directions with respect to each other, means for reciprocating said saddles in said opposite directions with respect to each other, frame members carried by said saddles and reciprocable therewith, slicing members carried by said frame members, means providing hinged connection between said frame members, to permit said frame members to have horizontal self-adjustment relative to each other to adjust themselves in position upon said saddles, said last-named means comprising arms arranged in pairs and pivotally connected together by vertically extending lugs fixed to the housing at each side of the saddles, posts extending upwardly from the other ends of the said arms, and bearing sleeves carried by the frames and slidable on the posts to provide a reciprocable connection between said posts and said frames.

CHARLES H. PETSKEYES.

REFERENCES CITED

The following references are of record in the file of this patent:

UNITED STATES PATENTS

| Number | Name | Date |
| --- | --- | --- |
| 1,995,096 | Fritz | Mar. 19, 1935 |
| 2,011,043 | Ferenci | Aug. 13, 1935 |
| 2,062,847 | Vollmer | Dec. 1, 1936 |
| 2,185,744 | Beutel | Jan. 2, 1940 |